United States Patent [19]

Thorvaldsen

[11] Patent Number: 4,534,127
[45] Date of Patent: Aug. 13, 1985

[54] DEVICE FOR A CASTING FLOAT

[76] Inventor: Sverre L. Thorvaldsen, Struervein 11 B, 1700 Sarpsborg, Norway

[21] Appl. No.: 570,582

[22] Filed: Jan. 13, 1984

Related U.S. Application Data

[63] Continuation-in-part of Ser. No. 237,158, filed as PCT NO 80/00024 Jul. 11, 1980, published as WO 81/00186 Feb. 5, 1981, § 102(e) date Feb. 17, 1981, abandoned.

[30] Foreign Application Priority Data

Jul. 24, 1979 [NO] Norway ................................. 792436

[51] Int. Cl.³ ....................... A01K 93/00; A01K 97/04
[52] U.S. Cl. ..................................... 43/41.2; 43/43.11
[58] Field of Search ................... 43/41.2, 44.9, 43.11; 24/115 H

[56] References Cited

U.S. PATENT DOCUMENTS

| | | | |
|---|---|---|---|
| 2,498,815 | 2/1950 | McVay | 43/44.9 |
| 2,603,905 | 7/1952 | Brzezinski | 43/44.9 |
| 2,808,632 | 10/1957 | Cline | 24/115 H |
| 2,888,771 | 6/1959 | Stephens et al. | 43/41.2 |
| 3,037,318 | 6/1962 | Schultz | |
| 3,352,050 | 11/1967 | Mowrey | 43/41.2 |
| 3,611,613 | 10/1971 | Perches | 43/41.2 |
| 3,694,951 | 10/1972 | Modeme | 43/41.2 |
| 3,753,309 | 8/1973 | Bryant | 43/41.2 |

FOREIGN PATENT DOCUMENTS 2848070  5/1979  Fed. Rep. of Germany ....... 43/41.2

Primary Examiner—Nicholas P. Godici
Assistant Examiner—M. Jordan
Attorney, Agent, or Firm—Lester Horwitz

[57] ABSTRACT

A device for a casting float of the kind through which passes a hole in which the line may run and with a chamber (2) which is open to the front and which forms an extension of the hole (3). This chamber (2) is dimensioned so that it will house the hook with its bait, livebait, flies or similar, and a sinker, where used. A stop which will prevent the line (5) from passing completely through the hole is attached to the line (5) above the float (1,3). A spool (7) is attached to the end of the line. The external dimensions of the spool match the chamber (2) and the spool is designed to be placed inside the chamber before the cast is made. Attached to the spool are one or more snells (16) with fishing-tackle in the form of, for example, a hook (17), flies, livebait or similar. The snells (16) are designed to be wound onto the spool during the cast. The spool may be used as the sinker, being made from a heavy material such as lead. When used as a float for fly-fishing or light spinning, the spool is made from a material with a dead weight which is approximately the same as that of water.

11 Claims, 9 Drawing Figures

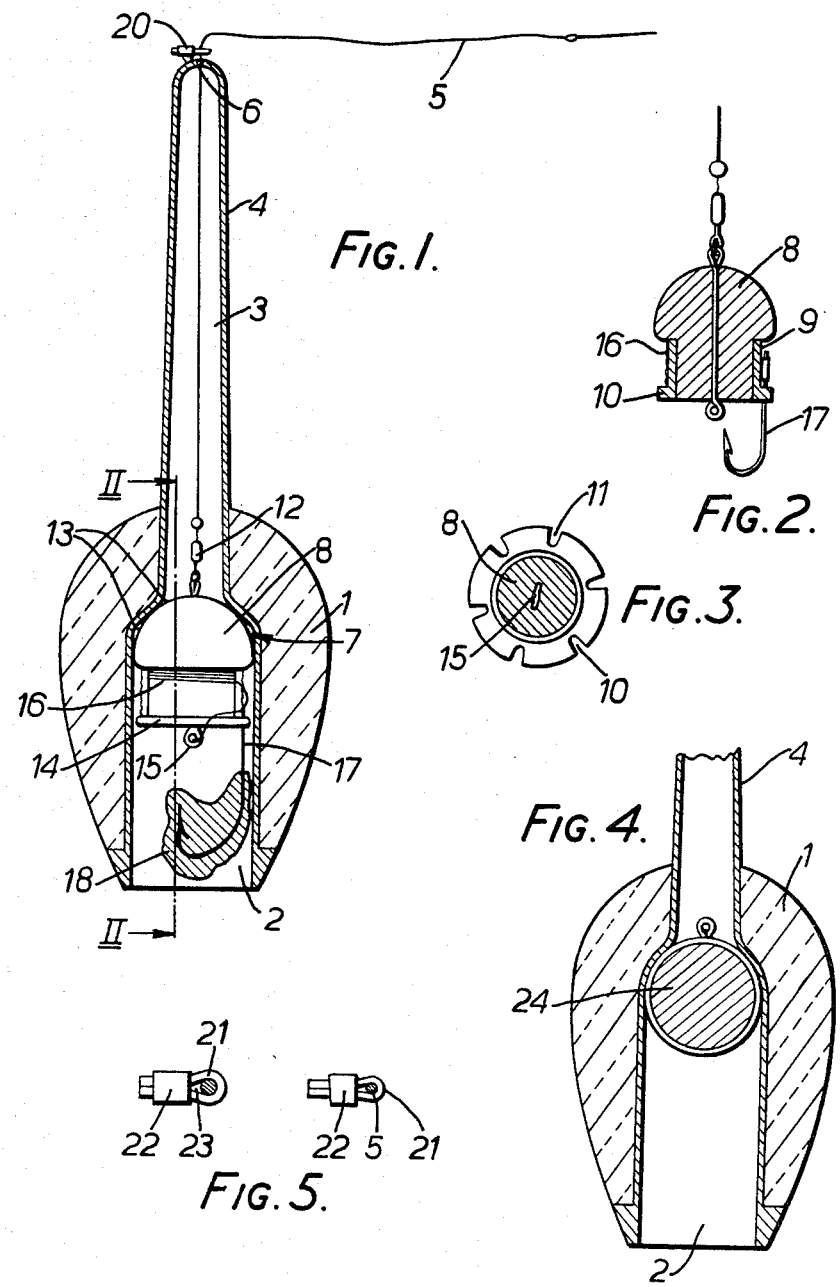

DEVICE FOR A CASTING FLOAT

CROSS REFERENCE TO RELATED APPLICATION

This application is a continuation-in-part of Ser. No. 237,158 filed as PCT NO 80/00024 Jul. 11, 1980, published as WO 81/00186 Feb. 5, 1981, § 102(e) date Feb. 17, 1981, now abandoned.

FIELD OF THE INVENTION

The present invention relates to a device for a casting float of the type through which passes a hole in which the line may run, with a chamber which is open to the front and which forms an extension of the hole, so dimensioned that it will house the hook with its bait, livebait, flies or similar, and where a stop which will prevent the line from passing completely through the hole is attached to the line above the float.

BACKGROUND OF THE INVENTION

Fishing with a casting float is extremely popular. With the help of a casting float it is possible to position the fishing-tackle at a relatively great distance from the bank, thus enabling a much greater area to be fished, often in much more favourable places than is the case in conventional float-fishing with a rod. Floats are used essentially with two main types of fishing-tackle, namely in angling where the hook is used with bait and a sinker, and also in the casting of flies or light spinners and similar tackle with the aid of a casting rod or a casting reel.

We are already familiar with a whole range of different types of casting floats. All earlier casting floats nevertheless had two main shortcomings, namely too little clearance between the sinker and the hook and problems in determining the correct depth.

It is a known fact that the fish is frightened when the sinker is too near the hook, and it is noticeable that much more fish is caught as soon as an adequate length of snell is left between the sinker and the hook with its bait. This problem was partly solved by means of the applicant's own U.S. Pat. No. 140,364, in which the float is provided with a hollow extension at the rear end such that a small sinker may be pushed into the bottom of the extension so as to produce a certain amount of clearance between the sinker and the hook. However, this clearance is greatly restricted in practice, since the length of the snell may not be greater than the distance from the hook in the front chamber to the rear edge of said extension. The length to which the snell is restricted in practice is 8-10 cm, and although this is a great improvement in relation to earlier designs of float in which the sinker was immediately adjacent to the hook, a snell of this length is still not ideal.

A stop is commonly attached to the line in such a way that, once the casting float has been cast, the hook and the sinker will leave the chamber in the float and will sink downwards towards the bottom until the stop makes contact with the rear end of the float. When finding the correct depth, however, one must work forward laboriously by trial and error in an effort to find the depth at the point at which the float is being cast, and then attaching the stop in such a way as to give the hook adequate clearance from the bottom. During these trials there is of course a great risk of the hook getting fast on the bottom.

The problems referred to above are associated with the use of the casting float in connection with so-called angling. When using the casting float in connection with fly-fishing and light spinning, etc., the problem has been to wind the snell on the float in such a way that it is firmly attached to the float during the cast, but that it will unwind as soon as the float hits the water. Various solutions have been proposed, for example in accordance with Norwegian Pat. No. 98285, in which the float is fitted with an axially sliding front part which is pushed into contact with the upper part of the float during the cast, thus holding the snell in place, and where the front part of the assembly will be pushed forwards to release the line when the float hits the water. Other solutions have also been proposed in which the fly or flies are attached by means of a fairly weak permanent magnet and in which the flies are released from the magnets by inertia as the float hits the water.

SUMMARY OF THE INVENTION

The aim of the present invention is to specify a float in which the above problems are solved in a simple, cheap and reliable fashion, so that the length of the snell may be selected from within much wider limits, in which the depth of water in which one happens to be fishing may be measured in a simple manner, and in which flies and light spinners, etc., are attached to the float in reliable fashion and will be released just as reliably when the float hits the water.

This has been achieved in accordance with this invention by means of a device for a casting float of the type described in the introduction which is characterized by a spool which is attached to the end of the line and has external dimensions which match the chamber, and which is designed to be placed inside the chamber before the cast is made, and in that to the spool are attached one or more snells with fishing-tackle in the form of a hook, fly, livebait or similar, said snells being designed to be wound onto the spool during the cast.

In a practical and preferred embodiment the spool is cylindrical in shape and the axis of the spool is coaxial with the line and the snell when extended. The chamber in the float is usually cylindrical in shape and the preferred spool will consequently fit inside this chamber, and the line and the snell may be attached to opposite ends of the spool, e.g. by means of a swirl or swivel.

So as to ensure that the snell stays on the spool during the cast, the spool in accordance with this invention is provided with an annular flange at the front (facing the snell). According to one preferred embodiment of the invention the radial flange has at least one radial groove cut in it which preferably reaches in as far as the body of the spool. It is better if there are several equally spaced grooves in the annular flange, said grooves being provided so that the neck of the hook may be placed in a groove once the snell has been wound onto the spool, said neck lying axially within the chamber and being held fast in this way between the spool and the wall of the chamber.

One preferred embodiment designed for use in angling is characterized in that the spool serves as a sinker and is made from a piece of a heavy material such as lead plus a shell-shaped or cup-shaped spool which is secured to the outside of the heavy body. One very great advantage of the casting float in accordance with this invention is that relatively heavy sinkers may be used, since the sinker and the hook with its bait are housed in a very compact space within the chamber and because of the large clearance between the sinker and the hook, which means that a large sinker will not have the effect of frightening the fish. The size of the sinker in earlier designs of casting float was restricted by both of these factors.

One very important feature of the casting float in accordance with this invention is characterized in that it has a long shape in the direction of the hole, and in that it and the sinker are balanced in such a way that when the sinker is inside the chamber the float will adopt a perpendicular attitude when it is on the surface of the water, and that it will lie flat on the surface of the water when no weight is present in the chamber.

The stop which enables the depth to be measured simply is characterized in that it has an adjustable opening or hole through which the line passes. The stop may thus be set so that it will slide easily along the line, but yet will be held firmly by it. After the float has been cast, the sinker will pull the line through the stop and once the sinker has reached the bottom, then the line and the float and everything else may be pulled in, when the stop will mark the actual depth. The stop may then be moved a suitable distance, e.g. 1-2 meters closer to the end of the line and tightened so that it grips the line firmly. When the float is cast once more, the sinker will pull the line out until the stop comes into contact with the rear edge of the float, when the sinker will be at the correct distance above the bottom A.

A simple embodiment of the stop in accordance with this invention is characterized in that it consists of a strand of highly flexible, elastic material, e.g. plastic, which is bent into a U-shape around the line, and in that the arms of the U are secured by a sheath which is placed around the arms so that it may be moved in such a way that the opening at the base of the U may be made larger or smaller.

BRIEF DESCRIPTION OF THE DRAWINGS

The invention will now be described in more detail with reference to the drawings which illustrate one embodiment of the invention.

FIG. 1 shows a section through a float in accordance with one embodiment of the invention;

FIG. 2 is a section through II—II in FIG. 1;

FIG. 3 shows a special design with a depth measurement sinker;

FIG. 4 shows a round ball replacing the spool for depth measurement;

FIG. 5 shows one embodiment of a depth measurement stop in two positions;

DETAILED DESCRIPTION OF THE INVENTION

Figure 6:
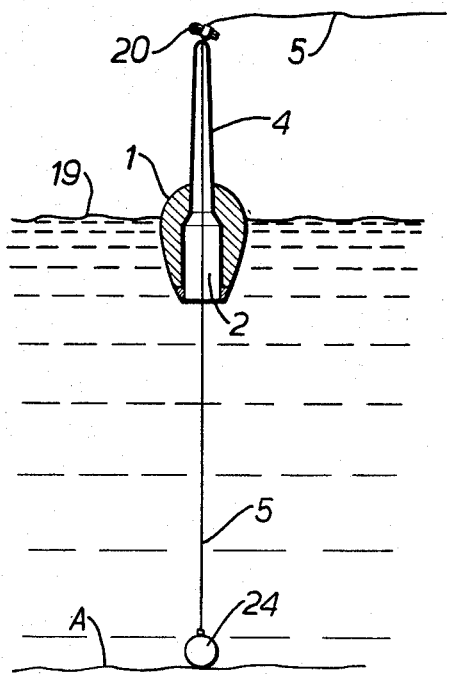
FIG. 6 shows the float in accordance with this invention during depth measurement.

The float consists of a float body 1, e.g. made of hard plastic foam, which has at its front end a chamber 2 open to the front and which continues at the rear in the form of a line guide channel 3 inside a rod-shaped extension 4 of the float. The line 5 is led through a narrow opening 6 in the rear end of the extension 4. The line passes through and is attached to a take-up spool which is identified as an entire unit by 7. In the embodiment shown in FIG. 1 the spool also serves as a sinker, said spool consisting of a lead body 8 on which is placed a plastic spool 9. At the front of the spool 9 is an annular flange 10 in which are cut radial grooves 11, spaced out equally around the circumference. The line 5 is attached to the rear end 13 of the sinker 7 by means of a swivel 12. Attended to an eye 15 at the front end 14 is a snell 16 with a hook 17 which is provided with bait 18. Before the float is cast, using either a casting rod or a casting reel, the sinker and the spool are positioned as shown in FIG. 1. The snell 16 is wound onto the spool 9 and the neck of the hook 17 is laid in the most suitable groove after the snell has been wound onto the spool, in such a way that the eye of the hook and part of the neck are in contact with the body of the spool and the neck of the hook lies axially within the chamber 2. As may be seen from the sectional drawing in FIG. 1, this provides a very compact arrangement of the hook and bait and the sinker. The space inside the chamber may be used in this way to produce a large, heavy sinker. This is of very great advantage when fishing, since the tackle will sink rapidly to the bottom and no particularly great lateral forces will occur which will displace the float over the surface of the water.

To the line to the rear of the float is attached a line stop 20 of a special kind which may be seen in greater detail in FIG. 5. In this embodiment the stop consists of a flexible, elastic strand 21 of, for example, plastic. This strand is bent into a tight U-shape around the line 5 by drawing in a sheath 22 at the ends of the strand. To the left of the figure the sheath has been drawn so far out towards the ends of the arms that the opening 23 is so loose that the line 5 will slide through the opening as the sinker sinks to the bottom, but the opening is still sufficiently tight for the line to be held firmly by the stop when no additional forces are applied to the stop. In the position shown to the right of FIG. 5 the sheath 22 has been pushed a little in the direction of the eye or opening 23 of the U, causing this to become tighter with the result that the step now grips the line firmly in such a way that it will not slide under the effect of the weight of the sinker.

When the depth is to be measured, the stop is set as shown to the left of FIG. 5 and the float is cast. When the float hits the water, the sinker 7 with the hook and bait will drop to the bottom and the line will slide through the opening 23 in the stop 20. Once the sinker reaches the bottom, the line and the float are reeled in and the stop is moved closer to the stop by a suitable distance, e.g. 1-2 meters and is fixed to the line as shown to the right of FIG. 5. When the float is now cast once more, the sinker will drop to the bottom but will be checked by the firmly attached stop 20 so that fishing may take place at the correct distance from the bottom.

So as to avoid the risk of getting the hook fast on the bottom, the combined sinker and spool may be replaced for depth measuring by a round ball 24 as shown in FIG. 4.

FIG. 6 illustrates the manner in which depth measurement is done. The spherical sinker 24 has sunk to the bottom, whilst the line 5 has slid out from the stop 20.

Figure 7:
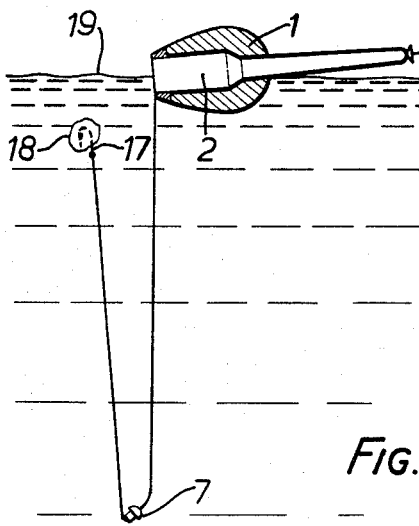
FIG. 7 shows the float after having been cast, resting on the water with the sinker and the hook on their way down to the bottom.
Figure 8:
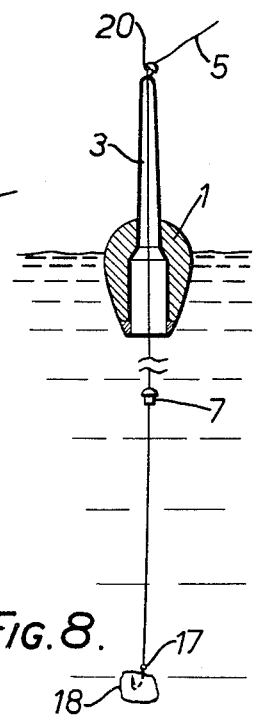
FIG. 8 shows the float when fishing, with the hook and the sinker suspended from the float at some distance from the bottom.

FIG. 7 and FIG. 8 show two positions in which the float indicates what is happening during fishing. FIG. 7 shows the sinker 7 on its way down to the bottom, and the float 1 is lying flat on the surface of the water 19. In the event of the sinker with the hook and bait not falling from the cavity 2 for whatever reason, the float is balanced in such a way that it will come into an upright position on the water, thus indicating that it is not fishing.

FIG. 8 shows the float during fishing, with the sinker 7 and the hook 17 with its bait 18 suspended beneath the float at a suitable distance from the bottom, and with the stop 20 fixed around the line 5. The weight of the sinker 7 will now cause the float to come up into the position shown in FIG. 8.

The Figures show the float being used in connection with angling. There is nothing to prevent the same design of float from being used for fishing with a number of individual livebaits by the method known as ledgering or hackling.

Where the float is to be used for fly-fishing or for light spinning, then the sinker 7 is replaced by a spool made for a material with a dead weight which is about the same as that of water. The snell or snells for the fly or flies or for the livebait or livebaits are wound onto the spool 9 and the flies or the livebaits are positioned in the same way as the hook 17. After the float has been cast, the spool will be released from the cavity 2 and the snell or snells will unwind from the spool, when fishing may proceed in the normal manner for other casting floats used in fly-fishing or in light casting. The adjustable stop 20 may be provided in many different ways to that shown in the drawing. The stop may thus consist of a sheath around the line, said sheath being fitted with a set-screw with, for instance, a soft rubber component on its inner end. The set-screw may be adjusted in this way to make more or less firm contact with the line which passes through it.

Figure 9:
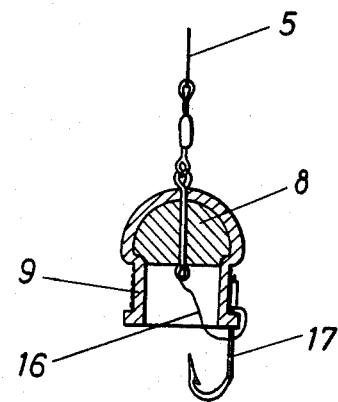
FIG. 9 shows an alternate embodiment of the spool suitable for use with the float of FIG. 1.

FIG. 9 illustrates a take up spool 7' used in an alternate embodiment of the invention. A hollow body 9' formed of a relatively low density material such as a plastic, houses a body 8' formed of a dense material such as lead. One end of the hollow body 9' is formed as a spool portion 9A for snell 16. An annular flange 10' is provided for hook 17, as described above with respect to previous figures. The lead body 8' occupies only the part of the interior of hollow body 9' removed from the spool portion 9A.

Use of the take up spool 7' with the embodiment of the invention as described in the previous figures is as described above. However, as soon as float 1 (FIG. 1) fitted with take up spool 7' of FIG. 9, hits the surface of the water, spool 7', serving as a sinker will fall from the chamber 2 and will turn at an angle of between 45° and 90° with respect to vertical. The snell 16 and hook 17 will then be efficiently released for fishing as shown in FIG. 7.

I claim:

1. A casting float device having a float body with a passageway through which a fishing line may run and a chamber which is open to a lower surface of the float boat and which is continuous with the passageway, the chamber being dimensioned so that it houses a sinker and a fishing tackle, in which the sinker and fishing tackle leave the chamber when the casting float has arrived at the water surface, and in which a stop is attached to the line above the float to prevent more than a predetermined length of the line from passing through the passageway, the sinker having a first portion in the shape of a spool and a second portion attached to the end of the line, the sinker having external dimentions which match the chamber so that the sinker is placeable inside the chamber before the cast is made, and a snell connecting the sinker to the fishing tackle, the sinker being configured so that the snell is windable on to the sinker and so that the snell remains so wound during casting, the first portion of the sinker being hollow, and the second portion of the sinker being filled with a dense material.

2. A device in accordance with claim 1 in which the sinker is cylindrical in shape and in which the axis of the spool is coaxial with the line and the snell when extended.

3. A device in accordance with claim 1, in which the sinker has an annular flange at the front thereof.

4. A device in accordance with claim 3, in which the annular flange extends radially from the sinker, the flange having at least one radial groove formed therein reaching in as far as the body of the spool.

5. A device according to claim 1 in which the sinker comprises a first member made of a cup shaped plastic material which defines said first and second portions.

6. A device in accordance with claim 1 in which the float is elongated in the direction of the passageway and in which the float and the sinker are balanced so that when the sinker is inside the chamber, the float will adopt a perpendicular attitude when it is on the surface of the water, and in which the float will lie flat on the surface of the water when no weight is present in the chamber.

7. A device in accordance with claim 1, in which the stop has an adjustable opening through which the line may be passed.

8. A device in accordance with claim 7, in which the stop consists of a strand of highly flexible, elastic material, which is bent into a U-shape around the line, and in which arms of the U are secured by a sheath which is placed around the arms so that the sheath is movable so that an opening at the base of the U may be made larger or smaller.

9. A device according to claim 1 in which the sinker is separable from the float body by a distance determined by the placement of the stop means along the line.

10. A device according to claim 1 in which the snell is of length which allows sufficient separation of the sinker and the tackle so as to avoid inhibiting fishing.

11. A device according to claim 1 in which the fishing tackle comprises a hook and bait therefor.

* * * * *